Oct. 21, 1958 W. E. DICKINSON 2,857,585

MAGNETIC DATA RECORDING AND REPRODUCING APPARATUS

Filed Feb. 13, 1957 2 Sheets-Sheet 1

INVENTOR.
WESLEY E. DICKINSON
BY
Lippincott & Smith
ATTORNEYS

MAGNETIC DATA RECORDING AND REPRODUCING APPARATUS

Filed Feb. 13, 1957 2 Sheets-Sheet 2

INVENTOR.
WESLEY E. DICKINSON
BY
Lippincott & Smith
ATTORNEYS

United States Patent Office 2,857,585

Patented Oct. 21, 1958

2,857,585

MAGNETIC DATA RECORDING AND REPRODUCING APPARATUS

Wesley E. Dickinson, San Jose, Calif., assignor to International Business Machines Corporation, New York, N. Y., a corporation of New York Application February 13, 1957, Serial No. 639,886

11 Claims. (Cl. 340—174)

This invention relates to the recording and reproduction of data as employed in electronic computers, and particularly to the recording and reproduction of data stored in the "memory" of a device of this character in such manner that access may be had, at random, to any desired piece of information so stored.

In large electronic computers both the computation and the programing are today usually accomplished in accordance with the binary system of notation employing only the figures 0 and 1. In the computation process the figure 0 may be represented, for example, by a negative pulse and the figure 1 by a positive pulse, although the actual polarities are unimportant and the signals may appear at different polarities in different parts of the circuit or in the same part of the circuit at different times, the selection of polarity being purely arbitrary.

In a large computer the amount of information that must be stored, ready for immediate access, must be very large and as a result the memory portion of the device can become extremely bulky. One of the best means available to date for storing the required information is by recording on a magnetizable medium, which usually takes the form of either a disc or a drum. The data are recorded on the medium as short areas of magnetization disposed along linear tracks, with area of magnetization in one direction on the track representing zero while an area magnetized in the opposite direction represents one.

In order to reduce the size of the memory apparatus as far as possible while storing a given amount of information it is desirable to make the area occupied by the information (hereinafter referred to as a "record") as small as possible. To do this the individual portion of the track corresponding to a single record must be narrow and the records closely spaced laterally, and it follows that in gaining access to a desired record the transducer head must be placed with extreme accuracy radially, in case the recording medium is a disc, or axially if it is a drum. Mechanical deviations in the access mechanism of very small value may result in garbling of information and computational errors. This is particularly true in the recording or "write" operation, where the one track may overlap another, even though very slightly.

The length along the track occupied by a given record should also be as short as possible and to this end the pulses representing zero or one must be closely spaced. A magnetic pick-up head will only deliver a signal, however, where there is a change of magnetization of the recording medium, and there is also a high-frequency cut-off that results in complete failure to reproduce where the wavelength, as recorded on the medium, is short compared to the length of the gap in the pick-up or "read" transducer. Thus, if a succession of recorded pulses is to be reproduced as such, there must be a spacing between pulses of the same sign and this spacing must be of the general order of magnitude of the width of the gap in the "read" head. In order to avoid the necessity for such spacing between pulses of like sign, the "non-return-to-zero" or NRZ system of recording has been devised. In accordance with this system a fixed length of time is alotted to each pulse representing a digit in a multi-digit, binary number, with no spacing between pulses. As reproduced, the record appears in a code wherein a pulse represents a change in sign between successive digits, as from zero to one or the reverse, the direction of the pulse indicates the direction of the change in sign and the order of the digit is represented by the lapse in time from the initiation of the record until the pulse occurs. Thus, if an interval of $t$ microseconds is allowed for each digit, the binary number 1000110 might be represented by positive pulse at time zero, a negative pulse at time $t$, a positive pulse at time $4t$, a negative pulse at time $6t$, etc., this arrangement results in shortening a given record by a factor of nearly one-half.

The present invention is directed to NRZ recording. Among its objects are to provide a method wherein previously recorded signals are completely erased during recording and do not interfere with reading the newly recorded record. Another object of the invention is to provide apparatus employing a simplified recording and erasing head assembly and still another is to provide an arrangement wherein the same head is used for both the writing and reading operation, without changes in connection as far as the heads themselves are concerned. Other objects and features of the invention will become apparent in the course of the description which follows.

The invention is employed in combination with a magnetic medium moved, during operation, at constant speed. In accordance with the invention two heads are used, positioned to trace a common path along the medium, the order of these heads being such as to engage the medium in succession as it moves past them: first an erasing head and, second, a slightly narrower recording head, which preferably also serves as a "read" head. The recording or "write" head has disposed upon it at least one winding and the erasing head has a single winding. The apparatus is supplied with NRZ signals, i. e., timed signals that return to or pass through zero only upon a change in significance of successive digits, from 0 to 1 or the reverse, usually from a trigger or flip-flop circuit. The coils are so connected that the winding on the writing head is excited only when the digits to be recorded are of one significance; 0 to 1 but not both, to magnetize the medium in one direction. The winding on the erasing head is connected to excite it continuously, to magnetize the medium in the opposite direction to the magnetization from the writing coil irrespective of the significance of the digits being recorded. As a result the track produced has margins that are continuously magnetized unidirectionally, bordering a central path having areas where the magnetization is intermittently reversed with respect to the margins interspersed with areas where the magnetization of the central and marginal portions is the same. A convenient way of accomplishing this is to connect the erasing coil so that it is excited by current from both sides of the flip-flop circuit. Preferably the magnetization in either direction is substantially of saturation value.

Switching means are provided for transferring from the writing to the reading operation. This requires that the exciting circuits to the coils be opened, that at least the reading (previously the writing) coil be connected to the output circuit, and that means be provided for eliminating spurious signals developed in the erasing head from the output circuit.

The fuller description of the invention which follows is illustrated by the accompanying drawings wherein.

Figure 1:
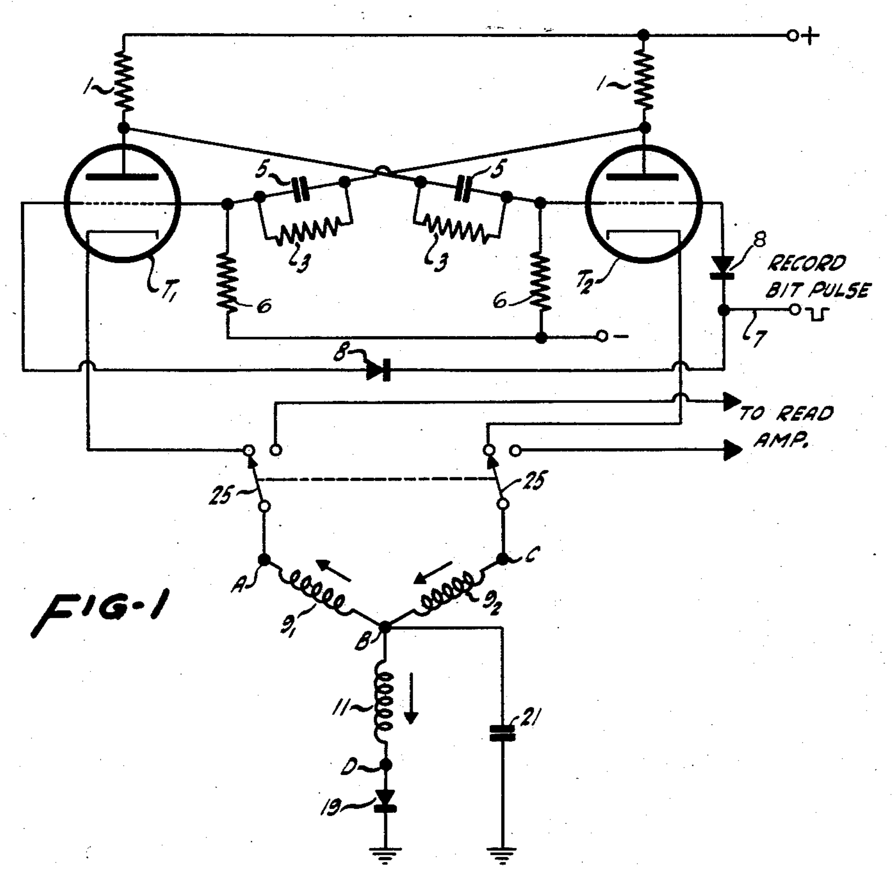
Fig. 1 is a schematic diagram of the connections of the recording and erasing heads, with an exciting circuit comprising a trigger adapted to be actuated by NRZ signals.

In Fig. 1 the transducer heads with which the invention is particularly concerned are illustrated as excited by a trigger circuit, which is a substantially conventional Eccles-Jordan flip-flop. This circuit employs two similar triodes $T_1$ and $T_2$. The two triodes are supplied with anode potentials, through similar resistors 1, from a common source, now shown. The anode of each triode is cross-connected to the grid of the other through a resistor 3 in parallel with a capacitor 5, and each grid is connected to a source of negative bias through an individual grid resistor 6. The grids of the tubes are also connected to an input circuit 7, through which are supplied pulses representing the bits of information to be recorded through routing diodes 8. In the present case it is assumed that these pulses are all of the same sign, irrespective of whether the change in state of the trigger represents a change from 0 to 1 or the reverse. With this arrangement only one tube at a time carries current; an incoming negative pulse reverses the state of the two tubes, rendering the one that has been non-conducting conducting, and vice-versa.

The cathode of tube $T_1$ connects through one coil $\mathbf{9}_1$ on a "read-write" or "R–W" head 10. The cathode of tube $T_2$ connects similarly through a second coil $\mathbf{9}_2$ on the same head. The two coils are wound to excite flux in the head in opposite directions during respective periods when they carry current. This is illustrated in diagrammatic fashion in Fig. 2 which shows the coils disposed on the common core. The terminals illustrated in Fig. 2 and designated A, B, etc. are connected in circuit at the points similarly lettered in Fig. 1. In both figures the arrows adjacent to or within the representation of the coils represent the direction of the flux induced in the core while the coils are carrying current.

The common point B, to which both R–W coils are connected also connects to one terminal of an erase coil 11 on the core 13 of the erase head, this latter coil being so disposed as to develop a flux in the erasing gap 15 in the same direction as that developed in the recording gap 17 by the coil $\mathbf{9}_2$ and in the opposite direction from that so developed in gap 17 by the coil $\mathbf{9}_1$. The core 13 is made slightly wider than core 10, e. g., a few more laminations can be used in building up the core. Terminal D of coil 11 connects to ground through a rectifier 19, poled to pass current from the cathode of either tube $T_1$ or $T_2$. A condenser 21 connects from the terminal B (common to all three coils) to ground, in parallel with the erase coil and the rectifier 19. The supply of current to all coils is thus unidirectional but that through coils $\mathbf{9}_1$ and $\mathbf{9}_2$ is intermittent while that through coil 11 is substantially constant throughout the recording operation.

It has been previously proposed to use separate "read" and "write" transducers, the "write" transducer being wider than that used for the reading operation to provide a guard-band affording some latitude in the positioning of the "read" transducer. In accordance with the present invention a somewhat similar system is used, in that the erase head is wider than the R–W head; it differs in that the same head is used for both the "read" and the "write" operations but a guard-band is still provided by the erase head as will be more fully developed hereinafter.

The present invention can best be understood by considering what happens in a more conventional NRZ recorder. In such a device the point B of Fig. 1 would connect directly to the ground, without the intervention of the erase coil 11 and rectifier 19. Under these circumstances one or the other of the tubes $T_1$ or $T_2$ is always carrying current when the circuit is in operation and the current is of sufficient value to saturate the recording medium, so that if the tube $T_1$ is conducting the recording medium is magnetically saturated in one direction (which can be arbitrarily designated as "North"), while when the tube $T_2$ is conducting the medium will be saturated in the "South" direction. In accordance with the prior disclosure above-referred to, where the "write" head is wider than the "read" head, any misplacement of the "write" head will cause overlapping of adjacent tracks. As a result, the track last to be recorded may induce cross-talk, which may cause false readings in the earlier-recorded track.

In accordance with the present invention it is the erase head that is wider by an amount equal to four times the mechanical tolerance or maximum error in positioning the heads with respect to the track to provide a guard-band on each side of the track equal in width to twice the tolerance. Thus, if in recording one track the head is displaced to the right by the amount of the maximum error and in recording the next track to the right of the first the error is to the left by the maximum, the relative error will be double the tolerance, but it will still be only the guard-bands that overlap and no part of the first-recorded information will be erased in recording the second. Moreover, there will remain a band between the effective recordings that will effectively prevent cross-talk.

Figure 4:
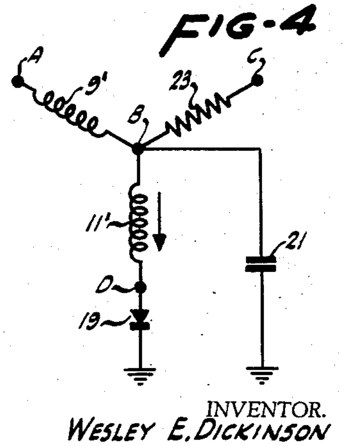
Fig. 4 is a fragmentary schematic diagram, illustrating the modifications of Fig. 1 involved when the dual head of Fig. 3 is employed.
Figure 3:
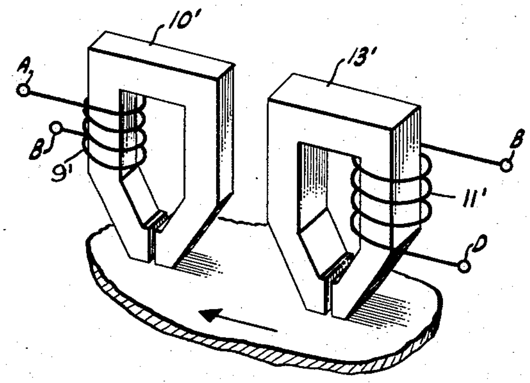
Fig. 3 is a diagram generally similar to Fig. 2, showing a dual head for the read, write and erase operations.

The erasure is accomplished by saturating the medium, just as is the writing operation. The erase head magnetizes the medium in the same direction as does coil $\mathbf{9}_2$ on the R–W head 9. It follows that coil $\mathbf{9}_2$ on the head 9 fulfills no useful purpose as far as the recording is concerned and can be omitted entirely, leading to a structure such as is shown in Figs. 3 and 4. In this case the R–W head 10' carries only a single coil 9'. The erase coil 11' is connected as before and as previously described is wound on a core that is wider than that of the head 9'. As is shown in the fragmentary circuit of Fig. 4, the place in the complete circuit occupied in Fig. 1 by coil $\mathbf{9}_2$ is occupied by resistor 23, of substantially equal impedance to coil 9'.

Figure 2:
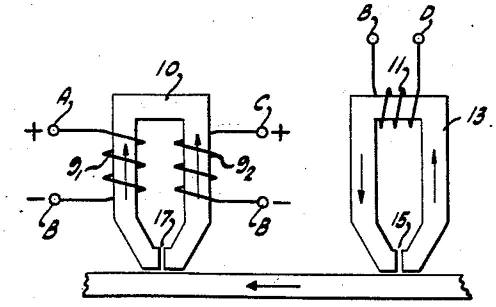
Fig. 2 is a diagrammatic representation of a conventional NRZ transducer, together with an erasing head showing their relative postions with respect to the tracks traced thereby on a recording medium.

While the coil $\mathbf{9}_2$ of Figs. 1 and 2 does no good in the "write" operation it does no harm, and in the reading operation it develops a signal equal to that in coil $\mathbf{9}_1$. It may be convenient, therefore, to use the connections illustrated in these figures in converting equipment to the type of operation herein described or to give a higher level output signal.

To accomplish the reading operation a double pole double throw switch 25 (Fig. 1) is thrown to the position shown open in the figure, to connect the heads to the "read" amplifier. It will be recognized that the two heads engage different points on the track and that therefore the information recorded will tend to induce false signals from the erase head in the amplifier circuit. In the embodiments shown in Figs. 1 and 4 this is prevented by the use of the rectifier 19 and condenser 21. The voltage level of the playback signals is very low, particularly in comparison with the voltages available in the writing operation. Condenser 21 has a very low impedance to the high frequencies appearing in either writing or reading the signals. The only signals produced in the reading operation are short pulses, comprising, substantially, high frequency components only, and to these components the condenser is very nearly a short circuit. At the low voltage levels developed across the coil 11 in reading, the rectifier 19 has a rather high resistance, since the type of rectifier used will normally be of a crystal diode type having a square-law response. The result is an effective suppression of the played-back pulses, which alternate in sign. In addition, the condenser carries the high frequency components at the leading edge of the recorded signals as they appear in the coil $9_1$ so that the rise time of the recordings is not increased by the inductance of the erase coil in series with the head doing the actual recording.

Figure 5:
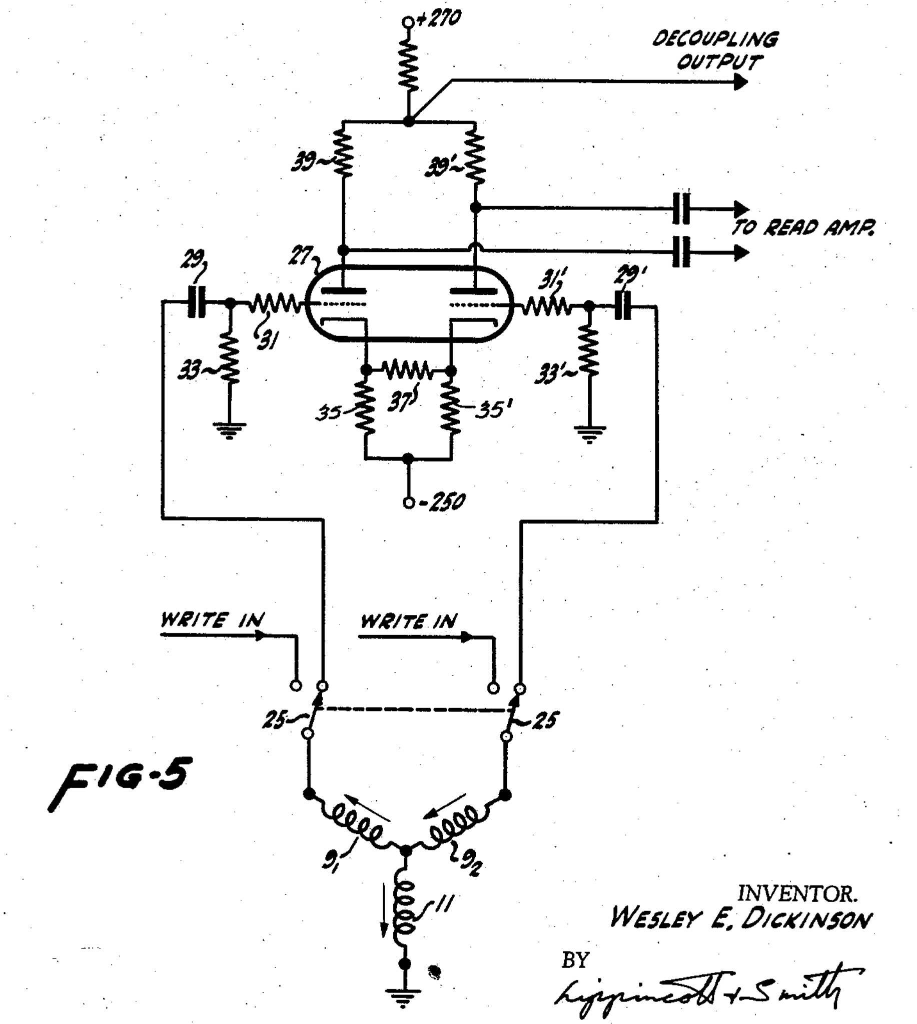
Fig. 5 is a diagram illustrating the use of a differential amplifier to eliminate spurious signals from the erasing head.

Another method of eliminating spurious signals from the erase head is illustrated in Fig. 5. In this figure the recording multivibrator is omitted, the switches 25 being shown as thrown to the "read" position. The connection of the heads is assumed to be that of Figs. 1 and 2, and the parts are numbered as in those figures, but the apparatus works equally well with a single "read" coil 9' as shown in Figs. 3 and 4.

In the arrangement of Fig. 5 the rectifier 19 and condenser 21 of Fig. 4 (or Fig. 1) are omitted. Otherwise the connection of the parts is the same, with the erase head connected in series with both sides of the recording flip-flop to carry unidirectional current irrespective of the state of the latter.

In the reading operation coil $9_1$ and $9_2$ connect, respectively, to the two input terminals of a differential amplifier, through switches 25. In the amplifier shown, coil $9_1$ connects to one grid of a dual triode 27 through a blocking condenser 29 and a small damping resistor 31. Coil $9_2$ connects to the other grid of tube 27 through like-numbered elements, distinguished by primes. The grids are biased to ground potential through grid resistors 33, 33'. A heavy negative feedback for both triode sections is provided by cathode resistors 35 and 35' and the two cathodes are directly coupled, somewhat loosely, by a resistor 37 of rather low value, i. e., of the same order of magnitude as the dynamic impedance of the two tube sections.

Each of the two anodes is provided with its individual load resistor 39, 39', connected together at their distal ends and to a common resistor 41 that connects in turn to the positive side of the power supply at B+. A so-called "decoupling output" may be taken from the junction between resistors 39 and 41 for purposes not directly concerned with the present invention.

It has already been stated that the two branches of the circuit, including the coil $9_1$ and $9_2$ respectively, are balanced as to impedance so that the voltages developed on the two grids of tube 27 as a result of a pickup by the erase head are also equal. It may be desirable, in some cases where the asymmetrical circuit of Figs. 3 and 4 is employed, to use a "dummy head" matching the inductance of coil 9' instead of the resistor 23 to achieve this equality but ordinarily this is not necessary because the impedance of the elements 9' and 23 is so low in comparison with the total impedance of the circuit including the resistors 33, 33'.

In any event, with equal voltages applied to the two grids the voltages across the resistors 39 and 39' will rise and fall together and no differential signal will appear across the output circuit. The signals developed in coil $9_1$ (or 9') on the R–W head will appear across resistor 39 only, giving the desired signal. If the circuit of Fig. 1 is used the voltages across coils $9_1$ and $9_2$ vary in opposite senses and the same result is attained.

It will be recognized that various other differential amplifiers are known in the art, any of which can be substituted for that described in detail. That shown has the advantage that because of the heavy feedback its output is very nearly independent of the characteristics of dual tube 27.

It will also be recognized that an entirely separate source may be used for exciting the erase coil during recording, but this complicates the switching and wiring arrangements as well as requiring a separate source of supply.

It will be recognized that in seeking access to a particular record the heads are still subject to lateral displacement with respect to their positions in the recording operation. As both of these operations have been described, the portions of the track that are magnetized in the "South" direction are the full width of track-plus-guard bands. Those portions that are magnetized "North" are the width of the R–W head alone, without guard bands. Lateral displacements of the heads in reading therefore produce a weakening of the signal but they cannot produce a false signal; as long as the gap in the head 9 or 9' embraces any portion of the track, a change in sign of that portion will induce a pulse in the proper direction and as long as the pulse is there it is possible to amplify and shape it to give it its required characteristics. The invention therefore greatly increases the reliability of the memory and eliminates a most prolific source of error, at the same time permitting the size of the memory equipment to be reduced to minimum dimensions.

It will be recognized that the recording heads may take many forms, as may the circuits supplying them. The particular equipment shown and described is therefore intended to be illustrative merely, the scope of the invention being defined in the claims which follow.

What is claimed is as follows:

1. In apparatus for recording information for use in digital computers and the like on a moving magnetic medium, the combination with a pair of supply circuits adapted to supply alternatively unidirectional currents representative of the information to be recorded, of a recording head adapted to be positioned to trace a record track on said medium and including a coil connected in one of said circuits, an erase head positioned ahead of said recording head with respect to the motion of said medium to trace thereon a track along the same path along said medium as that traced by said recording head, said erasing head including a coil so connected in series with said coil on the recording head as to induce in said medium magnetization oppositely poled with respect to that induced therein by said recording head, and connections from the other of said supply circuits to the erasing head coil to maintain a flow of current therethrough in the absence of current from said one circuit.

2. The invention as defined in claim 1 including a rectifier in series with the coil on said erase head connected to conduct current from both of said supply circuits and a condenser connected in parallel across said rectifier and last-mentioned coil.

3. In a magnetic recorder for bits of information as employed in digital computers and the like, wherein an erase head and a record head are mounted in that succession with respect to the motion of a recording medium, the combination of at least one record coil disposed on said record head, on erase coil disposed on said erase head and so connected in series with said record coil as to induce in said medium a flux in the opposite direction to that induced by said record head, and a trigger circuit having a pair of output circuits excited alternatively to supply current in the same direction, one of said output circuits being connected through both of said coils in series and the other thereof connected through said erase coil only.

4. In a magnetic recorder for bits of information as employed in digital computers and the like, wherein an erase head and a record head are mounted in that succession with respect to the motion of a recording medium, the combination of at least one record coil disposed on said record head, an erase coil disposed on said erase head and so connected in series with said record coil as to induce in said medium a flux in the opposite direction to that induced by said record head, a rectifier connected in series with said erase coil, a condenser connected in parallel with said erase coil and rectifier, and a trigger circuit having a pair of output circuits excited alternatively to supply current in the same direction, one of said output circuits being connected through both of said coils in series and the other thereof connected through said erase coil and rectifier only.

5. The combination as defined in claim 4 including a second record winding disposed on said record head and connected in series with said erase coil to said other output circuit.

6. The combination defined in claim 4 including an element of substantially equal impedance to said record winding connected in series with said other output circuit and said erase coil.

7. In apparatus for recording on and playing back from a moving magnetic medium bits of digital information, the combination of an erase head and a recording-and-reproducing head positioned to engage said medium in that order with respect to the motion thereof, an erase coil disposed on said erase head, at least one coil disposed on said recording-and-reproducing head and so connected in series with said erase coil as to magnetize said medium at opposite polarity to the magnetization produced therein by excitation of said erase coil when both are connected in series, an additional connection to the junction between said coils to supply exciting current to said erase coil only, a trigger circuit having a pair of output circuits excited alternatively to supply output current in the same direction one of said output circuits being connected to said one coil and said erase coil in series and the other output circuits being connected to said junction, an output circuit for reproduced signals, switching means for alternatively connecting the coil on said recording-and-reproducing head and said additional connection respectively to said pair of output circuits or to said output circuit for reproduced signals, and means for suppressing in said last-mentioned circuit signals developed in said erase coil.

8. The invention as defined in claim 7 wherein said means for suppressing signals developed in said erase coil comprises a rectifier connected to be in series with said erase coil when supplied either through said recording-and-reproducing coil or through said additional connection and a condenser in parallel with said erase coil and rectifier.

9. The invention as defined in claim 7 wherein said means for suppressing signals developed in said erase coil comprises a differential amplifier interposed in said circuit for output signals and having two control terminals, one of said terminals connecting through said switching means to said recording-and-reproducing coil and the other of said control terminals connecting through said switching means to said additional connection.

10. Magnetic recording-reproducing apparatus for translating digital information to and from a moving magnetic medium comprising transducer means adapted to trace a record track along said medium and including an erasing gap and a writing and reading gap positioned to follow said erasing gap along the same track and narrower laterally of said track, a pair of coils disposed on said transducing means including an erasing coil and a writing-and-reading coil adapted when energized to establish magnetic flux across the respective gaps to magnetize said medium, a trigger having two stable states and connected to excite said reading-and-writing coil when in one only of said states to magnetize said medium in one direction, and means for constantly exciting said erasing coil during recording to magnetize said medium in the opposite direction irrespective of the state of said trigger circuit, thereby producing a track the margins whereof are magnetized continuously in one direction throughout the extent thereof and a narrower central trace between said margins portions whereof are reversed in magnetization with respect to the remaining portions and said margins.

11. Apparatus as defined in claim 10 including an output circuit for reproduced signals, and switching means connected to interrupt the excitation of both of said coils and transfer to said output circuit signals developed from said medium in said reading-and-writing coil only.

No references cited.